(12) United States Patent
Taura et al.

(10) Patent No.: US 6,438,183 B1
(45) Date of Patent: Aug. 20, 2002

(54) DIGITAL AUDIO BROADCAST RECEIVER AND TUNING METHOD THEREOF

(75) Inventors: Kenichi Taura; Tadatoshi Ohkubo; Masayuki Ishida, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/274,775

(22) Filed: Mar. 24, 1999

(30) Foreign Application Priority Data

Apr. 23, 1998 (JP) ............................................ 10-113504

(51) Int. Cl.[7] .............................. H03D 1/00; H04L 27/06
(52) U.S. Cl. ....................... 375/343; 375/344; 375/326; 455/182.2; 455/182.3; 455/192.2; 455/193.3
(58) Field of Search ................................. 375/343, 344, 375/326, 354, 355, 142, 150; 455/136, 139, 164.1, 182.2, 182.3, 183.2, 184.1, 192.2, 192.3

(56) References Cited

U.S. PATENT DOCUMENTS 6,275,551 B1 * 8/2001 Nomura et al. .............. 375/365
6,314,083 B1 * 11/2001 Kishimoto et al. ......... 370/210

* cited by examiner

*Primary Examiner*—Mohammad H. Ghayour

(57) ABSTRACT

A digital audio broadcast receiver is tuned by performing a sliding correlation on data demodulated from a phase reference symbol, correlating the demodulated data with known data at negative carrier numbers and, separately, with known data at positive numbers, thus obtaining a lower correlation coefficient and an upper correlation coefficient. The peak sum of these two correlation coefficients, as found in the sliding correlation, is recognized as valid if the two correlation coefficients do not differ greatly in magnitude, and do not differ greatly in phase angle. The tuning is adjusted only according to sliding shifts corresponding to valid peak sums, thereby avoiding frequency control errors.

10 Claims, 13 Drawing Sheets

| j | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| h0,j | 0 | 2 | 0 | 0 | 0 | 0 | 1 | 1 | 2 | 0 | 0 | 0 | 2 | 1 | 1 | 1 |
| c0,j | 2 | 2 | 0 | 0 | 0 | 1 | 0 | 1 | 2 | 0 | 0 | 2 | 0 | 3 | 0 | 3 |
| h1,j | 0 | 3 | 2 | 3 | 0 | 1 | 3 | 0 | 2 | 1 | 2 | 3 | 2 | 3 | 3 | 0 |
| c1,j | 3 | 3 | 1 | 1 | 1 | 2 | 1 | 2 | 3 | 1 | 1 | 3 | 1 | 0 | 1 | 0 |
| h2,j | 0 | 0 | 0 | 2 | 0 | 2 | 1 | 3 | 2 | 2 | 0 | 2 | 2 | 0 | 1 | 3 |
| c2,j | 0 | 0 | 2 | 2 | 2 | 3 | 2 | 3 | 0 | 2 | 2 | 0 | 2 | 1 | 2 | 1 |
| h3,j | 0 | 1 | 2 | 1 | 0 | 3 | 3 | 2 | 2 | 3 | 2 | 1 | 2 | 1 | 3 | 2 |
| c3,j | 1 | 1 | 3 | 3 | 3 | 0 | 3 | 0 | 1 | 3 | 3 | 1 | 3 | 2 | 3 | 2 |

FIG.5A

| | | | | | | |
|---|---|---|---|---|---|---|
| TEMPLATE | | 2 | 3 | 0 | 3 | |
| DATA | 1 | 2 | 3 | 0 | 3 | 2 |
| RESULT | | 0 | 0 | 0 | 0 | |

FIG.5B

| | | | | | | |
|---|---|---|---|---|---|---|
| TEMPLATE | | 2 | 3 | 0 | 3 | |
| DATA | 1 | 2 | 3 | 0 | 3 | 2 |
| RESULT | 1 | 0 | 1 | 0 | X | 0 | 3 | 0 |

FIG.5C

| | | | | | | |
|---|---|---|---|---|---|---|
| TEMPLATE | | 2 | 3 | 0 | 3 | |
| DATA | 1 | 2 | 3 | 0 | 3 | 2 |
| RESULT | X | X | X | X | 1 | X | X |

FIG.5D

| | | | | | | |
|---|---|---|---|---|---|---|
| TEMPLATE | 2 | 3 | 0 | 3 | |
| DATA | 1 | 2 | 3 | 0 | 3 | 2 |
| RESULT | 1 | 1 | X | 3 | |

FIG.5E

| | | | | | | |
|---|---|---|---|---|---|---|
| TEMPLATE | 2 | 3 | 0 | 3 | |
| DATA | 1 | 2 | 3 | 0 | 3 | 2 |
| RESULT | X | X | 1 | X | |

FIG.5F

| TEMPLATE | 2 | 3 | 0 | 3 | |
|---|---|---|---|---|---|
| DATA | 0 | 1 | 2 | 3 | 0 |
| RESULT | 2 1 | 2 1 | X X | X 3 | |

FIG.5G

| TEMPLATE | 2 | 3 | 0 | 3 | |
|---|---|---|---|---|---|
| DATA | 0 | 1 | 2 | 3 | 0 |
| RESULT | X X | X X | 2 1 | 0 X | |

FIG.5H

| TEMPLATE | 2 | 3 | 0 | 3 | |
|---|---|---|---|---|---|
| DATA | 0 | 1 | 2 | 3 | 0 |
| RESULT | 2 | 2 | X | X | |

FIG.5J

| TEMPLATE | | 2 | 3 | 0 | 3 | |
|---|---|---|---|---|---|---|
| DATA | 3 | 0 | 1 | 2 | 3 | 0 |
| RESULT | X | X | 2 | 0 | | |

FIG.5K

| TEMPLATE | 2 | 3 | 0 | 3 |
|---|---|---|---|---|
| DATA | 3 | 0 | 1 | 2 | 3 |
| RESULT | 3 2 | 3 2 | X X | X X |

FIG.5M

| TEMPLATE | 2 | 3 | 0 | 3 |
|---|---|---|---|---|
| DATA | 3 | 0 | 1 | 2 | 3 |
| RESULT | X X | X X | 3 2 | 1 0 |

DIGITAL AUDIO BROADCAST RECEIVER AND TUNING METHOD THEREOF

BACKGROUND OF THE INVENTION

The present invention relates to a receiver for digital audio broadcasting as described in Recommendation BS.774 of the Radiotelecommunication Sector of the International Telecommunications Union (ITU-R), entitled "Service requirements for digital sound broadcasting to vehicular, portable, and fixed receivers using terrestrial transmitters in the VHF/UHF bands," more particularly to the method by which the receiver detects the center frequency of the digital audio broadcast signal.

Digital audio broadcasting, also referred to as DAB, employs orthogonal frequency division multiplexing (OFDM) together with powerful error-correcting functions to transmit digital data at high speed with high reliability, even to mobile receivers which may be strongly affected by multipath fading. The digital data are modulated onto a large number of closely spaced OFDM carrier signals, which are combined into a single broadcast signal. A DAB receiver includes an automatic frequency control (AFC) circuit that keeps the receiver tuned to the center frequency of the broadcast signal. The AFC function is normally implemented in two stages: a coarse tuning stage that detects frequency error as an integer multiple of the OFDM carrier spacing; and a fine tuning stage that detects frequency errors less than the OFDM carrier spacing.

A conventional coarse tuning method, described in European Patent Application No. 0 529 421 A2, exploits a known constant-amplitude zero-autocorrelation data series, referred to as a CAZAC data series, which is inserted periodically into the broadcast signal as a phase reference symbol. The conventional method is a sliding correlation method that correlates the received phase-reference data series with the known CAZAC series, shifting the two series in relation to each other on the frequency axis until a clear peak correlation is found. Each shift of one data position corresponds to a frequency error equal to the OFDM carrier spacing.

FIG. 1 shows simulated results of the sliding correlation process. The correlated data series contained one hundred twenty-eight values. The values from zero to two hundred on the horizontal axis correspond to frequency errors of up to plus or minus one hundred times the OFDM carrier spacing. The values on the vertical axis indicate the magnitude of the correlation for each assumed frequency error. The large peak in the center represents the correct or true tuning point, with zero frequency error.

FIG. 1 also illustrates a problem in the conventional coarse tuning method: smaller peaks (false peaks) occur at intervals of sixteen OFDM carriers. This is due to the structure of the CAZAC data series, which will be described later. If the clear peak correlation found by the conventional tuning method is one of the false peaks, coarse tuning fails and the broadcast cannot be received.

The false peaks in FIG. 1 cannot be screened out simply from their heights. Under realistic operating conditions, with an imperfect transmission channel, the heights of the peaks vary, even when the total signal strength is constant. Although the true tuning point will always have the highest peak, it is not possible to predict in advance what the height of any of the peaks will be.

Nor is it possible to guarantee that the first peak encountered in a sliding correlation search will be the true peak, so the conventional coarse-tuning method is reliable only if the search range is enlarged to include a fairly large number of peaks, the highest of which can be safely assumed to be the true peak. Conducting a sliding correlation search over such a large range is computationally demanding, however, and requires an expensive, high-speed processor.

SUMMARY OF THE INVENTION

It is accordingly an object of the present invention to avoid mistaking false correlation peaks for the true tuning point.

Another object of the invention is to identify false peaks observed in isolation, without having to examine a plurality of peaks.

Another object is to avoid sporadic audio dropouts caused by automatic frequency control errors.

A further object is to enable a digital audio broadcast receiver to employ a comparatively inexpensive processor.

The invented method of tuning a digital audio broadcast receiver employs complex-valued data obtained from frequency-differential demodulation of a phase reference symbol, and comprises the following steps:

(a) sliding correlation of the complex-valued data with a lower series of CAZAC data transmitted on negatively numbered carriers in the phase reference symbol;

(b) sliding correlation of the complex-valued data with an upper series of CAZAC data transmitted on positively numbered carriers in the phase reference symbol;

(c) finding a shift at which the lower correlation coefficient and upper correlation coefficient have a sum with maximum magnitude;

(d) storing the lower correlation coefficient and upper correlation coefficient obtained at this shift;

(e) determining whether these upper and lower correlation coefficients differ in relative magnitude by more than a first amount;

(f) determining whether these upper and lower correlation coefficients differ in phase angle by more than a second amount;

(g) deciding, from steps (e) and (f), whether the shift found in step (c) is valid; and (h) adjusting the tuning of the digital audio broadcast receiver according to the shift found in step (c), provided the shift is valid.

The invention also provides digital audio broadcast receivers employing the invented method of tuning.

BRIEF DESCRIPTION OF THE DRAWINGS

In the attached drawings:

FIGS. 5A to 5M illustrate sliding correlations performed on the phase reference symbol;

DETAILED DESCRIPTION OF THE INVENTION

Figure 1:
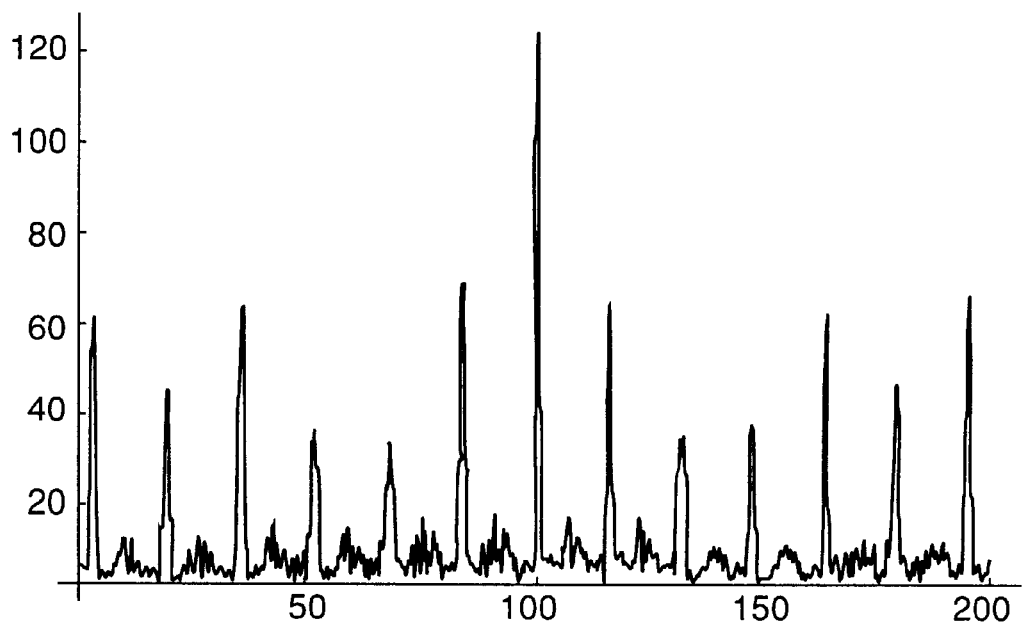
FIG. 1 is a graph of sliding correlation peaks obtained from a phase reference symbol.

Embodiments of the invention will be described with reference to the attached drawings, in which like parts are indicated by like reference characters.

Figure 2:
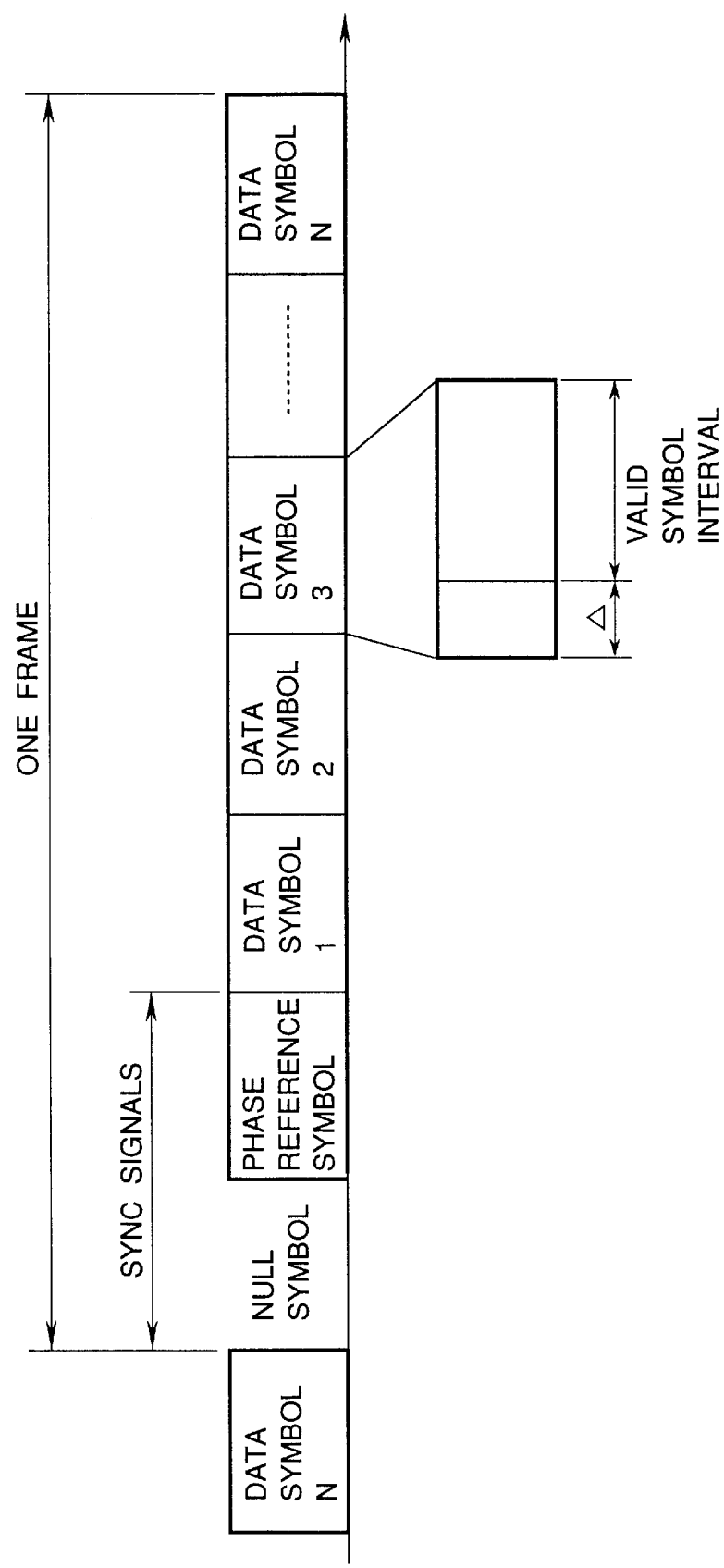
FIG. 2 illustrates the frame structure of a DAB signal.

A brief description will first be given of the DAB signal. Referring to FIG. 2, the signal is divided into frames, each comprising two synchronization signals followed by N data symbols, where N is a fixed positive integer. The first synchronization signal is a null symbol in which the carrier amplitude of the broadcast signal is reduced to zero. The second synchronization signal is a phase reference symbol. The data symbols comprise a valid data interval preceded by a guard interval ($\Delta$). The OFDM carriers are modulated by differential quaternary phase-shift keying (QPSK), the phase of each carrier being shifted at the beginning of each symbol. The phase reference symbol provides a starting point for the phase shifts.

The OFDM carriers are conventionally identified by positive and negative integer carrier numbers, the zero-th carrier being missing (having zero amplitude). In the phase reference symbol, the carrier phases are differentially modulated in the frequency direction according to the CAZAC data sequence mentioned earlier.

Figures 3, 4:
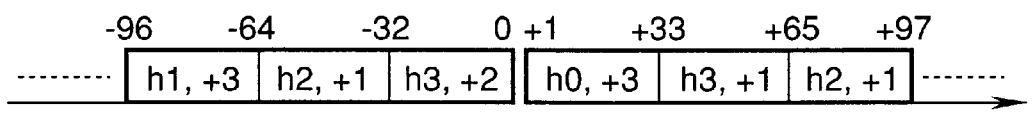
FIG. 3 illustrates CAZAC data sequences.
FIG. 4 illustrates the structure of a phase reference symbol.

FIG. 3 shows the CAZAC data specified in standard ETS 300401 of the European Telecommunication Standards Institute (ETSI). The numbers from zero to three should be interpreted as representing phase angles in units of ninety degrees ($\pi/2$ radians), or complex numbers of unit magnitude having these phase angles. Thus zero, one, two, and three represent the complex numbers 1, i, −1, and −i, respectively. The basic CAZAC data sequence appears in row c0. Rows c1, c2, and c3 are equivalent to row c0 rotated by $\pi/2$, $\pi$, and $3\pi/2$ radians, respectively. Rows h0, h1, h2, and h3 indicate the differential coding of the CAZAC data.

FIG. 4 illustrates the structure of the phase reference symbol in DAB Transmission Mode One. The data modulated onto the first thirty-two carriers with positive carrier numbers (+1 to +32) are two repetitions of the h0 sequence, with an additional phase offset of $3\pi/2$ radians (+3). Each successive group of thirty-two carriers similarly consists of two repetitions of the indicated row in FIG. 3, with the indicated offset. The rows are taken from FIG. 3 in a cyclic order (h0, h3, h2, h1, h0, . . . ) in the positive carrier frequency direction. For negatively numbered rows, a similar scheme is followed, the rows being taken in the same cyclic order in the negative carrier frequency direction. This scheme can be described by the following equation, in which $\psi_k$ is the phase angle of the k-th carrier, k' is a multiple of sixteen, and n is an integer from zero to three.

$$\psi_k = \pi/(h_{i,k-k'}+n)/2$$

The zero autocorrelation property of the CAZAC data means that a sliding correlation between repetitions of series c0, for example, yields a result of zero, unless the sliding shift is zero or a multiple of sixteen, in which case the correlated values are identical and the correlation coefficient is unity (1). Correlations between different series, such as between series c0 and c1, similarly yield zero correlation when the sliding shift is not zero or a multiple of sixteen. When the shift is zero or a multiple of sixteen, correlations between different series yield complex-valued correlation coefficients with an absolute value of unity but a phase angle of $\pi/2$, $\pi$, or $3\pi/2$ radians (i, −1, or −i).

Next, a description of the correlation values at the peaks in FIG. 1 will be given, with reference to FIGS. 5A to 5M. Each of these figures shows a template consisting of the CAZAC data in sixty-four positions above and sixty-four positions below the zero-th OFDM carrier. From left to right, the four template blocks represent CAZAC data sequences c2, c3, c0, c3, as indicated by the numbers in the blocks. Each template block contains two repetitions of the indicated sequence. The first two template blocks contain CAZAC data transmitted on OFDM carries numbered from −64 to −1. The last two template blocks contain CAZAC data transmitted on OFDM carriers numbered from +1 to +64. The template is shown being correlated with the data from a phase reference symbol at different positional shifts, corresponding to different frequency errors.

Before being correlated, the phase-reference data are differentially demodulated in the frequency direction, so the numbers in the data blocks have the same meaning as the numbers in the template blocks. In the correlation process, the complex conjugate of each demodulated data value is multiplied by the template value positioned directly above it. The results of these multiplication operations are indicated in the drawing by integers from zero to three and by the letter x. The integers from zero to three represent the complex numbers 1, i, −1, and −i, or equivalently, phase angles of zero, $\pi/2$, $\pi$, and $3\pi/2$ radians, as explained above. The letter x represents values that substantially cancel out.

FIG. 5A corresponds to the central peak in FIG. 1, with no frequency error. The data match the template exactly, and when correlated, uniformly yield products with a phase angle of zero, as indicated by the integer zero in the drawing. The correlation coefficient is a positive real number, which can be normalized to unity.

FIGS. 5B and 5C describe the situation at the false peak to the right of the central peak in FIG. 1. FIG. 5B corresponds to a frequency error equal to sixteen times the OFDM carrier spacing, in the positive direction. In the first sixteen template positions, having template carrier numbers from −64 to −49, sequence c2 is correlated with sequence c1, yielding products with a phase angle of $1 \times \pi/2$, indicated by the integer one in the drawing. In the next sixteen template positions, sequence c2 is correlated with itself, yielding products with a phase angle of zero. In the next sixteen positions, sequence c3 is correlated with sequence c2, yielding products with a phase angle of $1 \times \pi/2$; then sequence c3 is correlated with itself, yielding products with a phase angle of zero.

In the next sixteen positions in FIG. 5B, having template carrier numbers from +1 to +16, sequence c0 is correlated with sequence c3 with a positional shift of one carrier, due to the missing zero-th carrier. Because of the zero autocorrelation property of the CAZAC data, the phase angles of the sixteen products substantially cancel out, as indicated by the letter x. Specifically, one of the products is zero, and fourteen others cancel out in pairs, leaving a correlation coefficient with only a small absolute value.

In the next sixteen positions in FIG. 5B, sequence c0 is correlated with itself, yielding products with a phase angle of zero. In the last template block, phase angles of $3 \times \pi/2$ and zero are obtained in the first sixteen positions and last sixteen positions, respectively, as indicated in the drawing by the integers three and zero.

In FIG. 5C, the frequency error is seventeen OFDM carriers. Because of the zero autocorrelation property, the products substantially cancel out, except in the first sixteen positive template carrier positions, where sequence c0 is aligned with sequence c3, consistently correlating to a phase angle of $1 \times \pi/2$.

In FIG. 5D, the frequency error is thirty-two OFDM carriers. Consistent phase angles of $1 \times \pi/2$ are obtained by correlating the two template blocks on the negative side. On the positive side, one block yields substantially no correlation (x), and the other correlates to a phase angle of $3 \times \pi/2$.

In FIG. 5E, the frequency error is thirty-three OFDM carriers. The first template block on the positive side correlates to a phase angle $1 \times \pi/2$. The other blocks show substantially no correlation.

In FIG. 5F, the frequency error is forty-eight OFDM carriers. On the negative side, correlations of $1 \times \pi/2$ radians are obtained in the first half and correlations of $2 \times \pi/2$ radians in the second half of both blocks. The only correlation obtained on the positive side is $3 \times \pi/2$ radians in the second half of the second block.

In FIG. 5G, the frequency error is forty-nine OFDM carriers. Substantially no correlation is obtained on the negative side. Correlations at phase angles of $2 \times \pi/2$, $1 \times \pi/2$, and zero radians appear on the positive side.

In FIG. 5H, the frequency error is sixty-four OFDM carriers. The negative side correlates consistently at a phase angle of $2 \times \pi/2$ radians. Substantially no correlation appears on the positive side.

In FIG. 5J, the frequency error is sixty-five OFDM carriers. Substantially no correlation is obtained on the negative side. Correlations appear at phase angles of $2 \times \pi/2$ and zero radians on the positive side.

In FIG. 5K, the frequency error is eighty OFDM carriers. Correlations at phase angles of $3 \times \pi/2$ and $2 \times \pi/2$ radians appear on the negative side. Substantially no correlation is obtained on the positive side.

In FIG. 5M, the frequency error is eighty-one OFDM carriers. Substantially no correlation is obtained on the negative side. Correlations appear at phase angles of $3 \times \pi/2$, $2 \times \pi/2$, $1 \times \pi/2$, and zero radians on the positive side.

Larger positive frequency errors yield results similar to those shown in FIGS. 5H to 5M. Correlations appear on the negative side if the frequency error is a multiple of sixteen, and on the positive side if the frequency error is one more than a multiple of sixteen.

Negative frequency errors yield substantially a mirror image of the correlation results shown in FIGS. 5B to 5M.

From the above, it can be seen that at each of the false peaks in FIG. 1, one of the following conditions obtains: either the correlation is confined to one side of the template, as in FIGS. 5C, 5E, 5G, 5H, 5J, 5K, and 5M; or correlations are obtained on both sides but there is a large difference in phase angle between the correlations on the two sides, as in FIGS. 5B, 5D, and 5F. If the correlations are expressed as complex numbers normalized to an absolute value of unity over each template block, then in FIG. 5B, the correlation is (1+i) on the negative side and substantially (1−0.5i) on the positive side; the phase-angle difference between the two sides is approximately seventy-two degrees. In FIG. 5D, the phase-angle difference is one hundred eighty degrees. In FIG. 5F, the phase-angle difference is one hundred thirty-five degrees.

At the true peak, correlations with the same phase angle are obtained on both sides of the template. False peaks can therefore be distinguished from the true peak by correlating the upper and lower halves of the template separately, and comparing the two results. If the magnitudes of the two correlation coefficients differ greatly, one of the two being very small, or if the phase angles of the two correlation coefficients differ greatly, then the peak can be presumed to be false.

Figure 6:
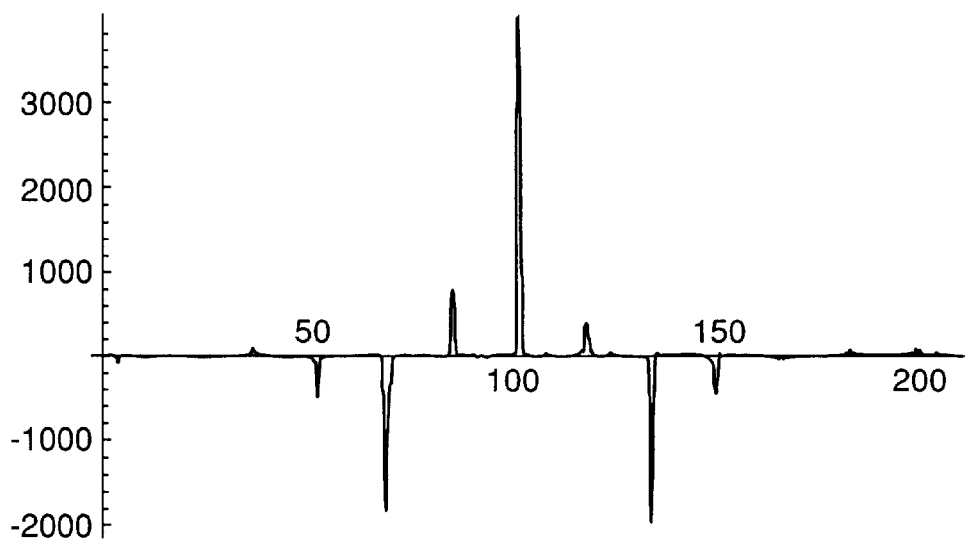
FIG. 6 is a graph of the real part of the product of upper and lower correlation coefficients.
Figure 7:
FIG. 7 is a graph of the imaginary part of the product of upper and lower correlation coefficients.

FIGS. 6 and 7 show the result of multiplying the lower correlation coefficient, obtained from the negative side of the template, by the complex conjugate of the upper correlation coefficient, obtained from the positive side of the template. The horizontal axis represents frequency in units of the OFDM carrier spacing, with one hundred corresponding to zero frequency error. The vertical axis represents the non-normalized numerical value of the product of the two correlation coefficients. FIG. 6 shows the real part of the product; FIG. 7 shows the imaginary part. For frequency errors of sixty-four OFDM carriers and greater, near the two ends of the horizontal axis, one of the two correlation coefficients is small, and the product is nearly zero. For the false peaks at frequency errors of sixteen carriers (84 and 116 on the horizontal axis), the products have small positive real parts and large imaginary parts. For the false peaks at frequency errors of thirty-two and forty-eight carriers (52, 68, 132, and 148 on the horizontal axis), the products have negative real parts. At all false peaks, accordingly, either the product is very small, or the phase angle of the product differs greatly from zero.

The present invention uses the properties described above to distinguish between true and false correlation peaks.

Figure 8:
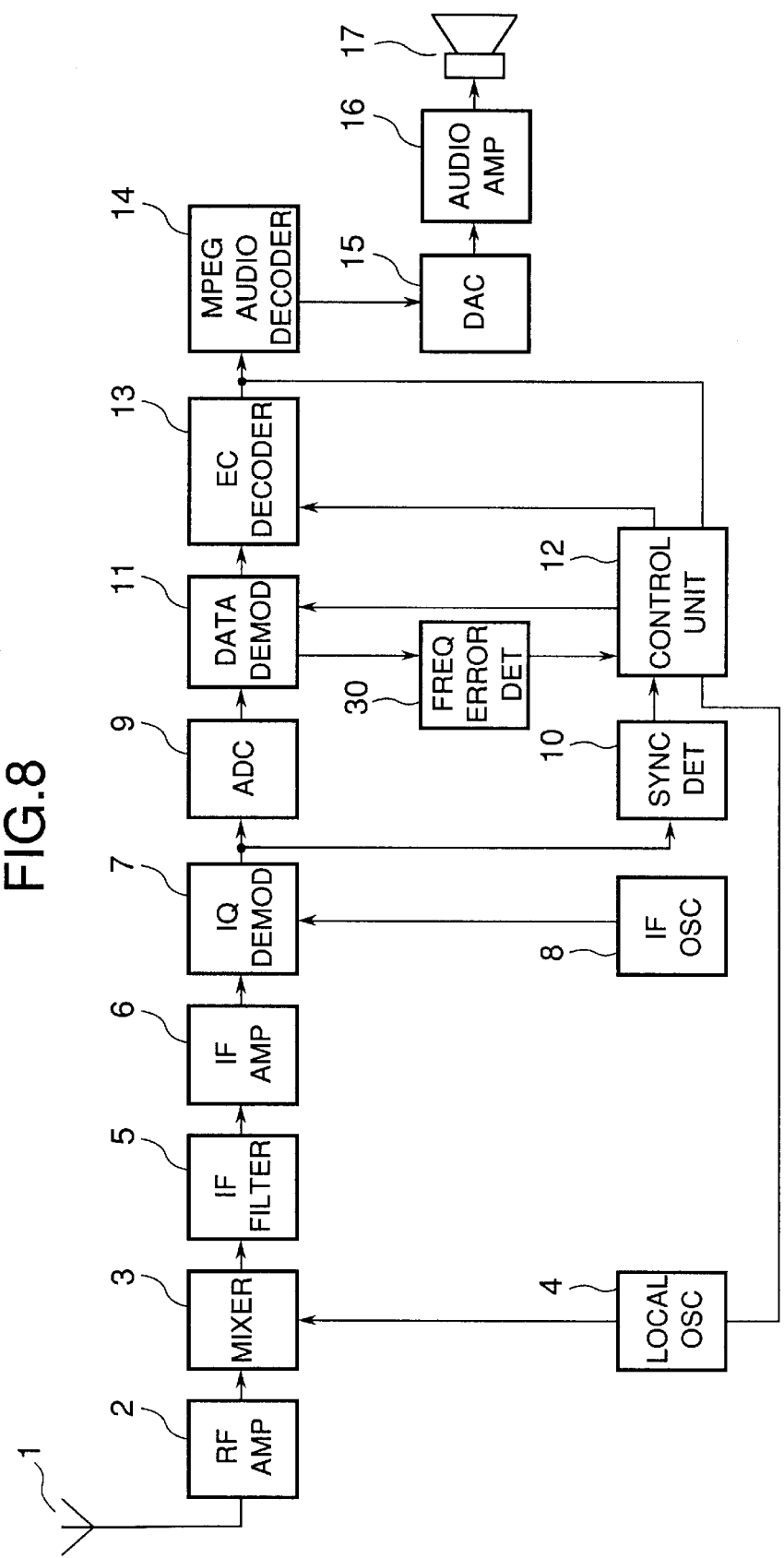
FIG. 8 is a block diagram of a DAB receiver illustrating a first embodiment of the invention.

FIG. 8 is a block diagram of a DAB receiver illustrating a first embodiment of the invention. The receiver comprises an antenna 1, a radio-frequency amplifier (RF AMP) 2, a mixer 3, a local oscillator (OSC) 4, an intermediate-frequency (IF) filter 5, an intermediate-frequency amplifier 6, an orthogonal demodulator (IQ DEMOD) 7, an intermediate-frequency oscillator 8, an analog-to-digital converter (ADC) 9, a synchronization signal detector (SYNC DET) 10, a data demodulator 11, a control unit 12, an error-correcting (EC) decoder 13, an MPEG audio decoder 14, a digital-to-analog converter (DAC) 15, an audio amplifier 16, a loudspeaker 17, and a frequency error detector (FREQ ERROR DET) 30.

A digital audio broadcast signal received at the antenna 1 is amplified by the radio-frequency amplifier 2, mixed in the mixer 3 with the output of the local oscillator 4, and thereby down-converted to an intermediate-frequency signal. The intermediate-frequency signal is filtered by the intermediate-frequency filter 5 to remove unwanted components such as adjacent-channel interference, then amplified by the intermediate-frequency amplifier 6, and mixed in the orthogonal demodulator 7 with quadrature signals from the intermediate-frequency oscillator 8 to generate a complex-valued baseband signal.

The analog-to-digital converter 9 samples the baseband signal and supplies digitized signal values to the data demodulator 11. The data demodulator 11 performs a discrete Fourier transform (DFT) to obtain QPSK values for each OFDM carrier, and carries out differential demodulation by comparing the phase values from one symbol to the next to obtain the demodulated data values. These data values are output to the error-correcting decoder 13 in a sequence matching the sequence in which data are modulated onto the OFDM carriers in the transmitter. The error-correcting decoder 13 performs a de-interleaving process, followed by a convolutional decoding process that corrects transmission errors.

The decoded data include compressed audio data, which are supplied to the MPEG audio decoder 14, and programrelated data describing the content and format of the broadcast, which are supplied to the control unit 12. The MPEG audio decoder 14 expands the audio data according to ISO/MPEG Layer Two procedures. The digital-to-analog converter 15 converts the expanded audio data to an analog audio signal, which is amplified by the audio amplifier 16 and reproduced through the loudspeaker 17.

Incidentally, ISO stands for International Standards Organization, and MPEG for Motion Picture Experts Group.

The synchronization signal detector 10 extracts the envelope of the analog baseband signal to detect the null symbol that indicates the beginning of each frame. The control unit 12 uses the timing information provided by the synchronization signal detector 10 to synchronize the operation of the data demodulator 11 and error-correcting decoder 13, so that each symbol is correctly demodulated and decoded. The control unit 12 comprises a computing device such as a microprocessor.

The data demodulated from the phase reference symbol in each frame are supplied to the frequency error detector 30 and control unit 12, both of which use the phase reference information to detect frequency errors. The frequency error detector 30 detects frequency errors as integer multiples of the OFDM carrier spacing. The control unit 12 detects errors smaller than the OFDM carrier spacing. The control unit 12 adjusts the oscillation frequency of the local oscillator 4 according to the detected frequency errors, thereby carrying out automatic frequency control (AFC).

Figure 9:
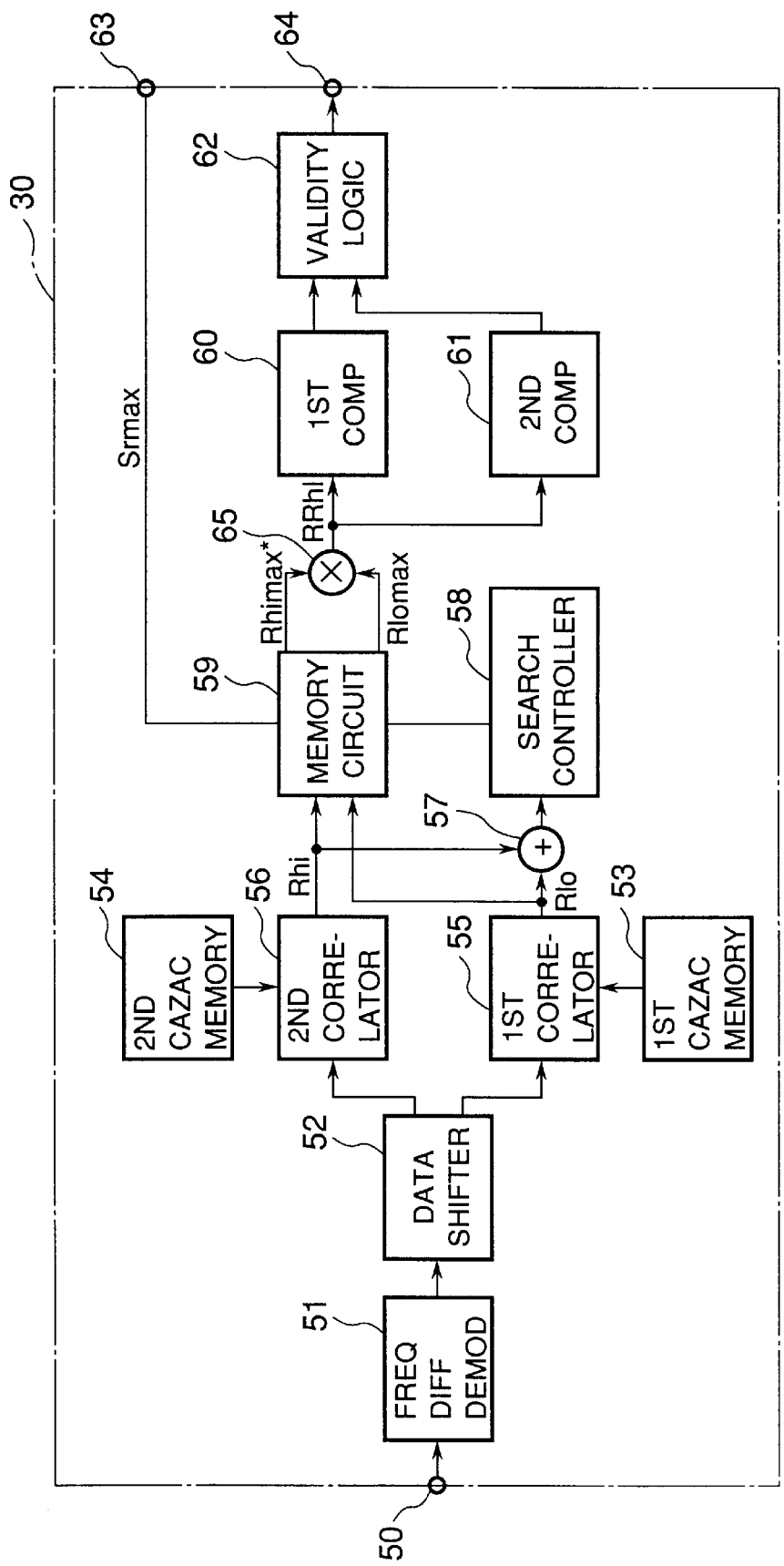
FIG. 9 is a block diagram showing the internal structure of the frequency error detector 30 in FIG. 8.

FIG. 9 shows the internal structure of the frequency error detector 30, comprising an input terminal 51 for the phase reference symbol data, a frequency-differential demodulator (FREQ DIFF DEMOD) 51, a data shifter 52, a first CAZAC memory 53, a second CAZAC memory 54, a first correlator 55, a second correlator 56, a complex adder 57, a search controller 58, a memory circuit 59, a first comparison circuit (COMP) 60, a second comparison circuit 61, a validity logic circuit 62, an output terminal 63 for a frequency error value, an output terminal 64 for a validity signal, and a multiplier 65.

The phase reference symbol data received at the input terminal 50 are differentially demodulated in the frequency direction by the frequency-differential demodulator 51, then stored in the data shifter 52. The data shifter 52 selects a lower group of data for input to the first correlator 55, and an upper group of data for input to the second correlator 56. The first correlator 55 correlates the data in the lower group with CAZAC data stored in the first CAZAC memory 53. The second correlator 56 correlates the data in the upper group with CAZAC data stored in the second CAZAC memory 54. The first CAZAC memory 53 stores lower CAZAC data corresponding to negatively-numbered OFDM carriers, e.g., carrier numbers −64 to −1. The second CAZAC memory 54 stores upper CAZAC data corresponding to positively numbered OFDM carriers, e.g., carrier numbers +1 to +64. The lower correlation coefficient Rlo obtained by the first correlator 55 and the upper correlation coefficient Rhi obtained by the second correlator 56 are supplied to the adder 57 and the memory circuit 59. The adder 57 adds the values of the two correlation coefficients, and supplies their sum to the search controller 58.

The search controller 58 controls the data shifter 52 so as to shift the data included in the lower group and upper group over a specified search range, compares the absolute values of the sums received from the adder 57, and finds a shift that maximizes the absolute value of the sum. The search controller 58 commands the memory circuit 59 to retain the value of this shift, together with the correlation coefficients produced by this shift. The search controller 58 supplies the shift value to the memory circuit 59.

At the end of the search carried out by the search controller 58 on one phase reference symbol, the memory circuit 59 holds the value of a shift Srmax that produced a correlation of maximum magnitude between the demodulated phase reference symbol data and the CAZAC data, together with an upper correlation coefficient Rhimax and a lower correlation coefficient Rlomax obtained using the stored shift value Srmax. The shift value Srmax is output at output terminal 63 as a frequency error value. If the search range included the true tuning point, Srmax represents the actual frequency error as a multiple of the OFDM carrier spacing. If the search range did not include the true tuning point, Srmax corresponds to a false correlation peak.

To distinguish between these two cases, the multiplier 65 multiplies one of the two correlation coefficients stored in the memory circuit 59 (e.g., Rlomax) by the complex conjugate of the other correlation coefficient (e.g., Rhimax*), and supplies their product RRhl to the first comparison circuit 60 and second comparison circuit 61.

The first comparison circuit 60 compares the absolute value of the product RRhl with a predetermined constant $\epsilon$, and sends the validity logic circuit 62 a signal indicating a valid result if the absolute value of RRhl exceeds $\epsilon$. The constant $\epsilon$ is equal to, for example, about one-tenth of the value that would be obtained under substantially ideal reception conditions with complete correlation between the received data and the CAZAC data. As illustrated in FIGS. 6 and 7, the first comparison circuit 60 excludes false peaks farther than forty-eight times the OFDM carrier spacing from the true peak.

The second comparison circuit 61 compares the absolute value of the phase angle of the product RRhl with a predetermined phase angle $\theta$. If the phase angle of RRhl has an absolute value less than $\theta$, the second comparison circuit 61 sends the validity logic circuit 62 a signal indicating a valid result. The smallest phase angle expected at a false peak within forty-eight carriers of the true peak is seventy-two degrees, so $\theta$ can be set a little below one-half this value. For example, $\theta$ can be set equal to about thirty degrees. The second comparison circuit 61 then excludes false peaks within forty-eight times the OFDM carrier spacing of the true peak.

The validity logic circuit 62 outputs a validity signal indicating that the frequency error Srmax indicated at output terminal 63 is valid as a tuning indicator if the signals from both comparators 60 and 61 indicate valid results. Otherwise, the validity logic circuit 62 outputs a validity signal indicating that the frequency error Srmax is invalid.

The control unit 12 monitors both output terminals 63 and 64, and adjusts the frequency of the local oscillator 4 according to the frequency error values, obtained at output terminal 63, that are signaled as valid at output terminal 64. All of these frequency error values will have been derived from true peak correlations. The first embodiment thus avoids the problem of incorrect tuning due to detection of false peaks, even when the search range includes only false peaks.

Figure 10:
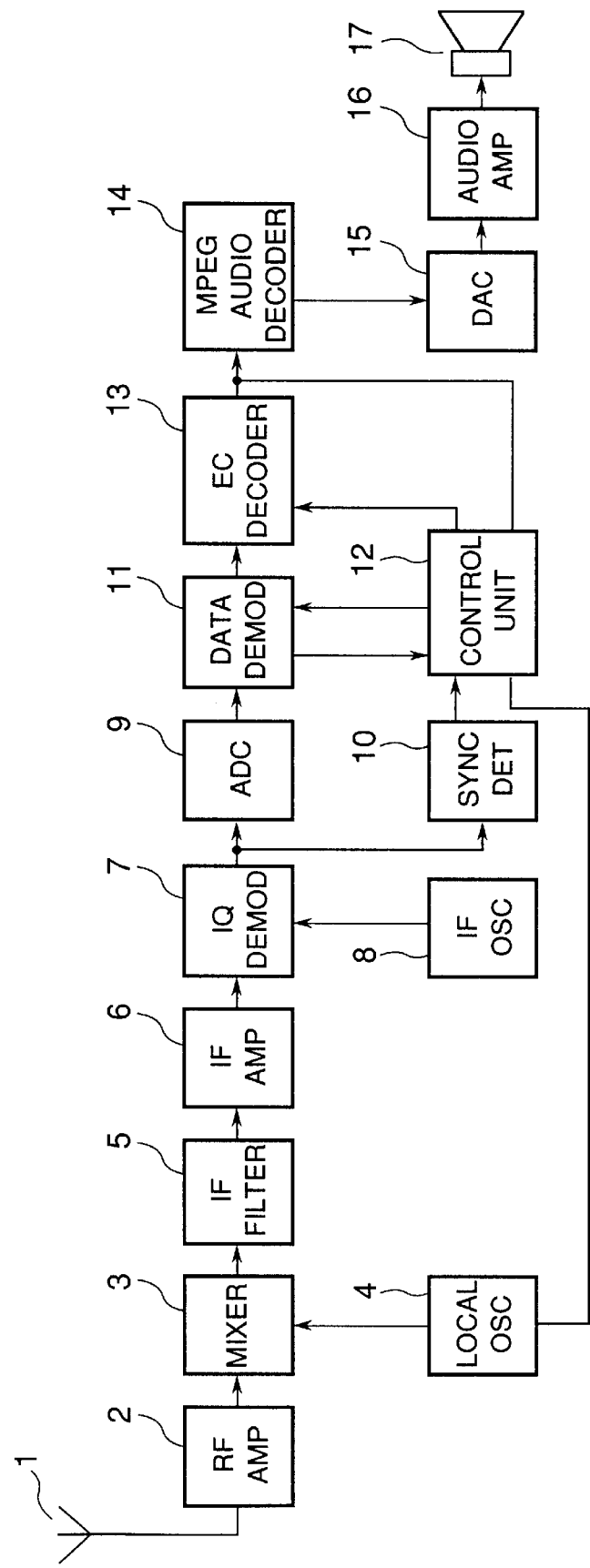
FIG. 10 is a block diagram of a DAB receiver illustrating a second embodiment of the invention.

FIG. 10 is a block diagram of a DAB receiver illustrating a second embodiment of the invention. In the second embodiment, the control unit 12 performs the calculations that were performed by the frequency error detector in the first embodiment. The other blocks in FIG. 10 operate in the same way as in the first embodiment; repeated descriptions will be omitted.

Figure 11A:
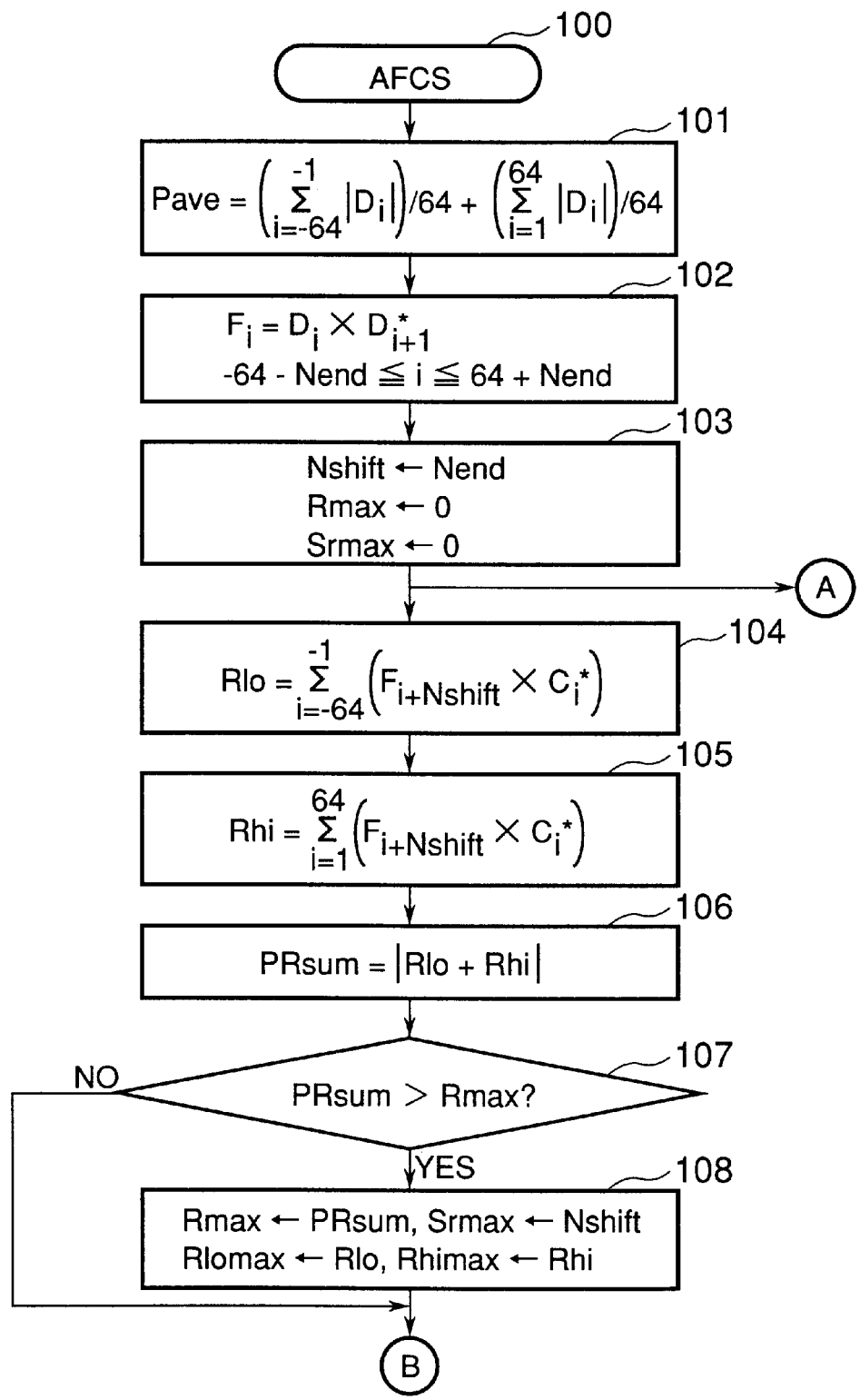
FIGS. 11A and 11B are a flowchart illustrating the operation of the second embodiment.

In the second embodiment, automatic frequency control is carried out as a subroutine, which will be described with reference to the flowchart in FIGS. 11A and 11B. It will be assumed that each correlation is carried out on one hundred twenty-eight data points.

When the automatic frequency control subroutine (AFCS) is called (step 100), the average power Pave of the data that will be used in the processing is calculated (step 101). This is done by, for example, calculating the average absolute value of about one hundred twenty-eight data points obtained by the discrete Fourier transform performed on the phase reference symbol. Data points for OFDM carrier numbers from plus/minus one to plus/minus sixty-four can be used, as indicated in the drawing. The absolute value $|D_i|$ of a data value $D_i$ is calculated from the following equation, in which $Re(D_i)$ and $Im(D_i)$ are the real and imaginary parts of the data value.

$$|D_i| = \{Re(D_i)^2 + Im(D_i)^2\}^{1/2}$$

Next, frequency-differential demodulation is performed to obtain demodulated data $F_i$ (step 102). Specifically, each data value $D_i$ is multiplied by the complex conjugate of the next data value $D_{i+1}$. This operation is carried out on OFDM carrier numbers from (−64−Nend) to (64+Nend), where Nend is the largest shift that will be employed in the search. Nend is thus equal to one-half the width of the search range. The number of data values demodulated in this way is one hundred twenty-eight plus the width of the search range, or 128+(2×Nend).

A shift value Nshift is now initialized to minus Nend, and two variables Rmax and Srmax are initialized to zero (step 103). Rmax is the maximum correlation found so far; Srmax is the shift value that produced the maximum correlation.

Next, the lower correlation coefficient Rlo is calculated by correlating the received data $F_i$ with the CAZAC data $C_i$ for OFDM carrier numbers from −64 to −1 with a frequency shift of Nshift (step 104). The upper correlation coefficient Rhi is obtained in the same way, using carrier numbers from +1 to +64 (step 105). These calculations are carried out by multiplying the demodulated data $F_{i+Nshift}$ by the complex conjugates of the CAZAC data $C_i$.

The two correlation coefficients Rlo and Rhi are then added, and the absolute value PRsum of their sum is calculated (step 106).

PRsum is now compared with the variable Rmax (step 107). If PRsum is greater than Rmax, then Rmax is updated to the value of PRsum, Srmax is updated to the value of Nshift, and the values of the correlation coefficients Rlo and Rhi are stored in variables Rlomax and Rhimax, respectively (step 108).

Figure 11B:
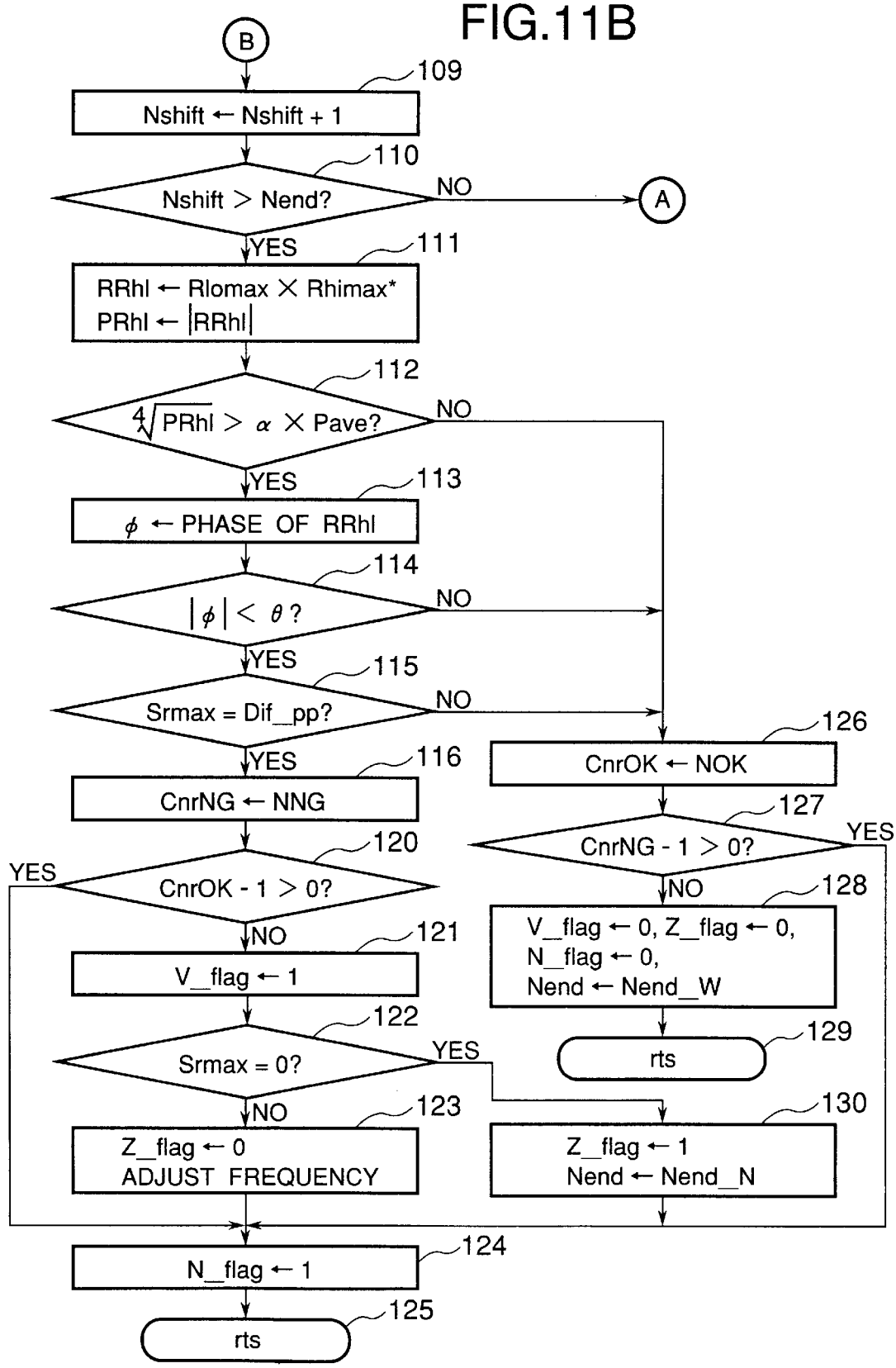

Referring to FIG. 11B, the shift value Nshift is next incremented by one (step 109) and compared with the maximum shift Nend (step 110). If Nshift is equal to or less than Nend, the process returns to step 104 in FIG. 11A to calculate new correlation coefficients. The loop from step 104 to step 110 is repeated until the entire range of shift values from −Nend to +Nend has been searched.

When the search is completed (Nshift>Nend), the product RRhl of Rlomax and the complex conjugate of Rhimax is calculated, the absolute value PRhl of this product is calculated, and the fourth root of PRhl is calculated (step 111). The fourth root of PRhl is compared with the average power Pave multiplied by a constant α (step 112). If the fourth root of PRhl is larger than α times Pave, the phase angle φ of the product RRhl is calculated (step 113), and the absolute value of the phase angle φ is compared with the predetermined phase value θ mentioned in the first embodiment (step 114). The absolute value of the phase angle φ is a non-negative number not exceeding π. If the absolute value of the phase φ is less than θ, the shift value Srmax that produced the peak correlation is compared with the shift value Dif_pp found by processing the previous phase reference symbol (step 115). If Srmax and Dif_pp are the same, then Srmax is regarded as representing a true frequency error. If Srmax and Dif_pp are not the same, Srmax is regarded as doubtful, and the value of Srmax is assigned to Dif_pp in preparation for the processing of the next phase reference symbol.

Step 112 excludes false peaks farther than forty-eight carriers from the true peak, because at these false peaks, the product RRhl and its absolute value PRhl are nearly zero, as explained earlier. Step 114 excludes false peaks within forty-eight carriers of the true peak, because at these false peaks, the absolute phase angle of the product RRhl is at least about seventy-two degrees, and θ is, for example, thirty degrees. Results of 'yes' in these two steps are a strong indication that a true peak has been detected, but as an additional precaution, step 115 checks that the true peak detected this time is in the same location as the true peak detected the last time, when the immediately preceding phase reference symbol was processed.

If 'yes' results are obtained in all three steps 112, 114, 115, then an unmatch counter CnrNG is initialized to a predetermined positive value NNG (step 116), and a match counter CnrOK is decremented by one (step 120). If this operation makes CnrOK equal to zero, then a validity flag (V_flag) is set to one (step 121), indicating that a true peak has been detected at the same shift Srmax consecutively a certain positive number NOK of times. The shift Srmax is now tested to see if it is equal to zero (step 122). If Srmax is not equal to zero, then a zero flag (Z_flag) is cleared to zero and the frequency of the local oscillator 4 is adjusted by an appropriate amount (step 123). The value of Dif_pp may also be adjusted in this step. Finally, a normality flag (N_flag) is set to one to indicate that automatic frequency control is proceeding normally (step 124), and the automatic frequency control subroutine ends with the execution of a return instruction (step 125).

If the result of decrementing CnrOK in step 120 is that CnrOK is still greater than zero, then steps 121, 122, and 123 are skipped, the normality flag is set in step 124, and the subroutine ends in step 125 without adjustment of the frequency of the local oscillator 4.

If a 'no' result is obtained in any one of steps 112, 114, and 115, indicating that the detected peak is not a true peak, or does not match the peak detected previously, the match counter CnrOK is initialized to NOK (step 126), and the unmatch counter CnrNG is decremented (step 127). If this operation makes CnrNG equal to zero, indicating that doubtful or false peaks have been detected NNG times consecutively, the validity flag V_flag, zero flag Z_flag, and normality flag N_flag are all cleared to zero, and a wide search width is selected by setting Nend to a predetermined value Nend_W (step 128). The automatic frequency control subroutine then ends with the execution of a return instruction (step 129). The next time the automatic frequency control subroutine is called, the wide search range will be used, increasing the probability of finding the true peak.

If the unmatch counter CnrNG is not made equal to zero in step 127, then the normality flag N_flag is set to one in step 124, and the subroutine ends in step 125, without alteration of the validity flag V_flag or zero flag Z_flag or the width of the search range.

If Srmax is found to be equal to zero in step 122, then the zero flag Z_flag is set to one, and a narrow search range is selected by setting Nend to a predetermined value Nend_N, which is less than Nend_W (step 130). Then the normality flag N_flag is set (step 124), and the automatic frequency control subroutine ends (step 125). The next time the subroutine is called, the narrow search range will be used.

The flags N_flag, V_flag, and Z_flag are used by other control routines in determining whether or not the DAB receiver is tuned correctly.

The second embodiment adjusts the frequency of the local oscillator 4 in multiples of the OFDM carrier spacing when a true peak is detected at the same non-zero shift Srmax a certain number NOK of times consecutively, selects a narrow search range if a zero frequency error is detected NOK times consecutively, and selects a wide search range if the true peak is not detected in NNG consecutive searches.

The average power Pave is used in setting the decision criterion in step 112 because if the DAB receiver is mounted in an automobile, for example, the strength of the received signal is highly variable. The reason for taking the fourth root of PRhl in this step is for dimensional consistency; the differential demodulation process in step 102 squares the magnitudes of the data values in relation to the average power value, and multiplying the two correlation coefficients Rlomax and Rhimax together causes a further squaring of magnitudes.

The adjustment of the frequency of the local oscillator 4 by a multiple of the OFDM carrier spacing in step 123 should not be made without a high degree of certainty in its correctness. The reason is that, if performed incorrectly, this adjustment can destroy correct tuning, causing a sudden disappearance of the reproduced audio signal, due to uncorrectable data errors. By waiting until the tests in steps 112 and 114 have been passed NOK times, with the same frequency error value Srmax obtained each time, the second embodiment provides the necessary degree of certainty, and avoids sporadic audio dropouts caused by mistakes in automatic frequency control.

By clearing the normality flag N_flag to zero when NNG consecutive searches fail to detect a true peak, the automatic frequency control routine in the second embodiment warns other control routines executing on the control unit 12 that automatic frequency control has been lost. This warning is a comparatively good indicator of conditions under which the broadcast signal cannot be received. It is also an indication that if no action is taken, the DAB receiver may drift so far out of control that natural recovery of correct tuning cannot be expected. The other control routines can respond to this warning by taking corrective tuning action: for example, by re-initializing the fine-tuning process, re-initializing the process that controls timing synchronization, or changing to a different broadcast frequency on which the same program is available.

By selecting narrow and wide search ranges, the second embodiment enables the control unit 12 to apportion its limited processing resources in an appropriate manner. When automatic frequency control has been lost, a substantial portion of the processing capability of the control unit 12 can be used to regain tuning quickly, by making a wide search. When correct coarse tuning has been achieved, the search range is narrowed so that more processing resources can be devoted to fine tuning and other tasks.

Next, a third embodiment will be described. The third embodiment has the hardware configuration shown in FIG. 10, and is generally similar to the second embodiment, but uses different criteria to distinguish true and false peaks.

The automatic frequency control subroutine in the third embodiment will be described with reference to the flowchart in FIGS. 12A and 12B. It will again be assumed that each correlation is carried out on one hundred twenty-eight data points.

Figure 12A:
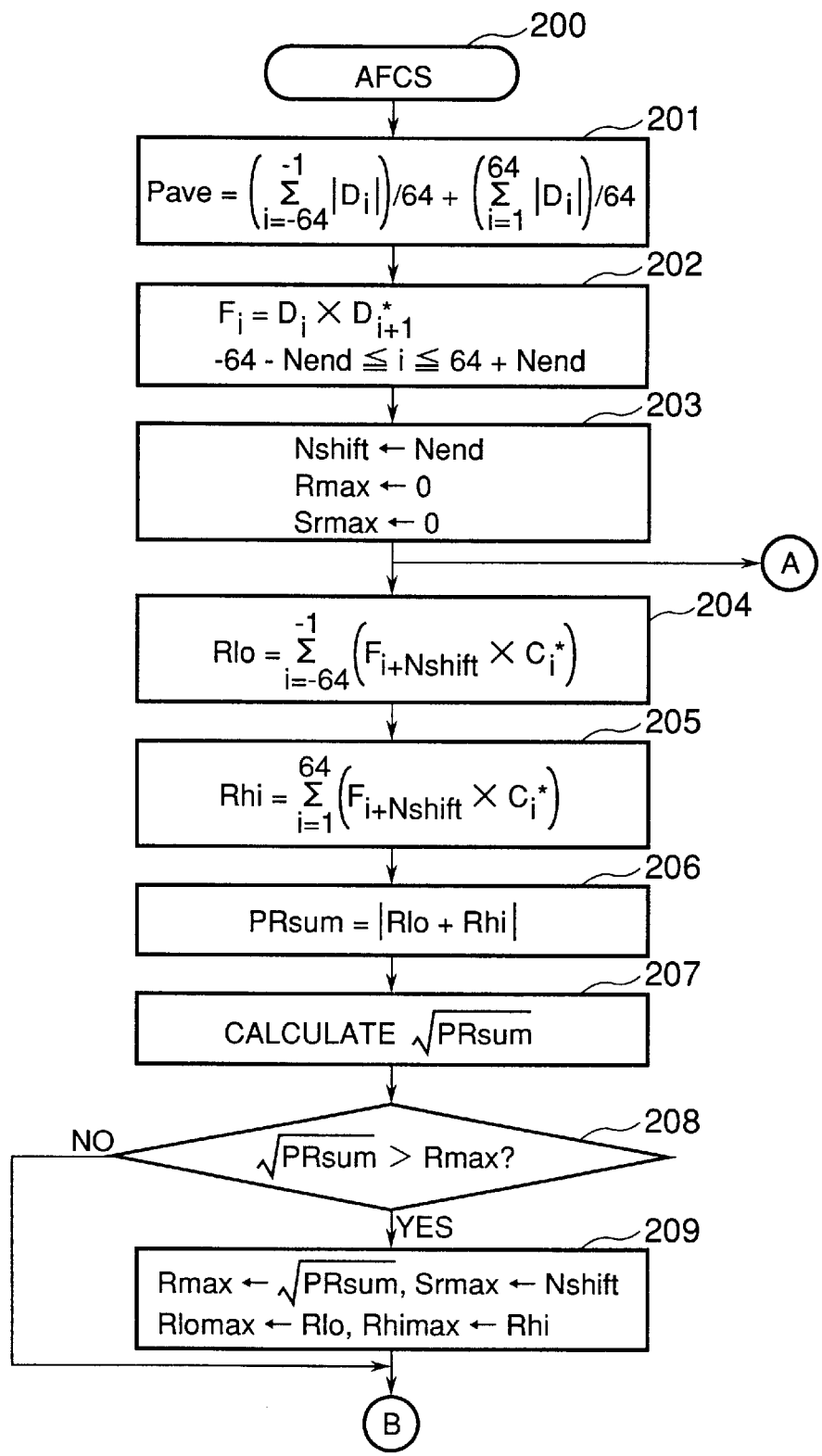
FIGS. 12A and 12B are a flowchart illustrating the operation of a third embodiment.

Referring to FIG. 12A, when the automatic frequency control subroutine is called (step 200) the average power Pave of the data to be processed is calculated (step 201), frequency-differential demodulation is performed (step 202), the variables Nshift, Rmax, and Srmax are initialized (step 203), the lower correlation coefficient Rlo is calculated (step 204), the upper correlation coefficient Rhi is calculated (step 205), and the absolute value PRsum of the sum of the two correlation coefficients is calculated (step 206). These steps are similar to steps 101 to 106 in the second embodiment.

Next, the square root of the absolute value PRsum is calculated (step 207) and compared with the variable Rmax (step 208). If the square root of PRsum is greater than Rmax, then Rmax is updated to the square root of PRsum, Srmax is updated to the current shift value Nshift, and Rlomax and Rhimax are updated to Rlo and Rhi, respectively (step 209). Differing from the second embodiment, Rmax acquires the same dimensions as the average power Pave.

Figure 12B:
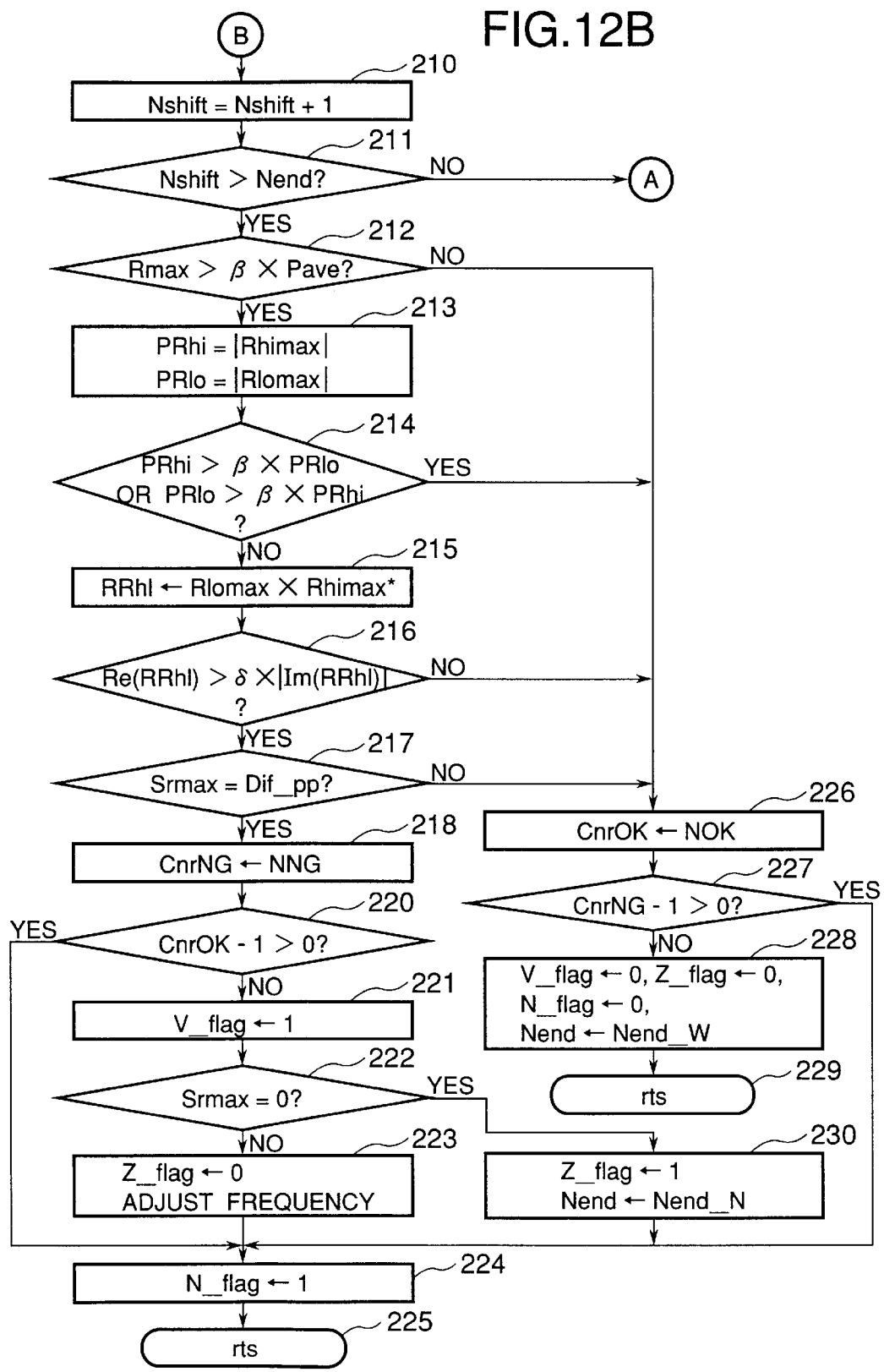

Referring to FIG. 12B, Nshift is incremented (step 210) and compared with Nend (step 211), the loop from step 204 to step 211 continuing until the entire search range from −Nend to +Nend has been covered.

The absolute value Rmax of the square root of the peak correlation found in the search is now compared with the average power value Pave multiplied by a constant $\beta$ (step 212). An appropriate value of $\beta$ is about two. If a DAB signal is being received, Rmax will normally be greater than Pave multiplied by $\beta$. If Rmax is less than Pave multiplied by $\beta$, a likely reason is that the DAB receiver is not even approximately tuned to any digital audio broadcast frequency.

If Rmax is greater than Pave multiplied by $\beta$, then the absolute value PRhi of Rhimax and the absolute value PRlo of Rlomax are calculated (step 213). These absolute values PRhi and PRlo are tested to see if they differ by a factor of more than the constant $\beta$. The test is carried out by comparing each absolute value with the other multiplied by $\beta$ (step 214). At false peaks farther than forty-eight carriers from the true peak, one of the two correlation coefficients is much smaller than the other, as explained above, so either PRhi will exceed PRlo multiplied by $\beta$, or PRlo will exceed PRhi multiplied by $\beta$.

If PRhi and PRlo do not differ by a factor of more than $\beta$, the product RRhl of Rlomax and Rhimax is calculated (step 215). The real part of this product Re(RRhl) is compared with the absolute value of the imaginary part Im(RRhl) multiplied by a positive constant $\delta$ (step 216). An appropriate value of $\delta$ is two, excluding values of RRhl disposed at phase angles more than about 26.7 degrees from the positive real axis. At false peaks within forty-eight carriers of the true peak, the phase angle of RRhl is separated by at least about seventy-two degrees from the positive real axis, as explained above.

The tests in steps 214 and 216 thus exclude all false peaks. If both tests pass, the peak correlation found in the search is provisionally recognized as a true peak, and the peak shift Srmax is compared with the peak shift Dif_pp found from the preceding phase reference symbol, to see whether the two peak correlations occurred at the same location (step 217).

The rest of the processing is similar to the processing in the second embodiment. If the two peak shifts match in step 217, the unmatch counter CnrNG is initialized (step 218), and the match counter CnrOK is decremented (step 220). If this reduces CnrOK to zero, the validity flag V_flag is set (step 221) and Srmax is tested (step 222). If Srmax is not zero, the zero flag Z_flag is cleared and the frequency of the local oscillator 4 is adjusted (step 223); then the normality flag N_flag is set (step 224) and the subroutine ends (step 225). If any one of the tests made in steps 212, 214, 216, and 217 fails, the match counter CnrOK is initialized (step 226), and the unmatch counter CnrNG is decremented (step 227). If CnrNG is now zero, all flags (N_flag, V_flag, Z_flag) are cleared and the wide search range Nend_W is selected (step 228); then the subroutine ends (step 229). If CnrNG is not zero, the normality flag N_flag is set (step 224) and the subroutine ends (step 225). If Srmax is zero in step 222, the zero flag Z_flag is set and the narrow search width Nend_N is selected (step 230); then the normality flag N_flag is set (step 224) and the subroutine ends (step 225).

The third embodiment provides substantially the same effects as the second embodiment by performing comparison tests that exclude false peaks, and adds a further test that excludes signals giving very small summed correlation values. This further test (step 212) may also be included in the second embodiment.

As described above, the present invention provides a DAB receiver in which the problem of coarse tuning errors due to detection of false peaks is substantially eliminated, either by the comparatively simple addition of a frequency error detector to the receiver circuitry, or by inexpensive modifications to the control program of the control unit in the receiver.

A particular advantage of the invented tuning method is that false peaks are identified as such without the need to a conduct a wide-ranging search or examine a plurality of peaks.

By basing decision criteria on the average power of the received data, the invented tuning method is able to operate reliably despite fading of the received signal.

By waiting for a true peak to be detected in the same location a certain number of times before adjusting the tuning, the invented tuning method effectively avoids sporadic audio dropouts caused by errors in automatic frequency control.

By counting consecutive phase reference symbols in which no true correlation peak is detected, the invented DAB receiver is able to identify loss of automatic frequency control quickly and take appropriate corrective action, including the selection of a wider search range.

By selecting a narrow search range when coarse tuning is completed, the invented method conserves the computational resources of the control unit in the receiver, enabling a comparatively inexpensive processor to be used in the control unit.

Various modifications are possible in the ways in which the comparison tests are carried out. For example, in the third embodiment, the test in step 214 can be carried out by dividing PRhi by PRlo and testing whether the quotient PRhi/PRlo is within limits equal to β and 1/β. In the second embodiment, (α×Pave) can be raised to the fourth power, instead of taking the fourth root of PRhl.

The data stored in the first CAZAC memory 53 and second CAZAC memory 54 in the first embodiment need not be the full sequence of, for example, one hundred twenty-eight CAZAC data values. Since the CAZAC data series comprises repetitions of a basic series of only sixteen values (c0 in FIG. 3) with phase-angle rotations in multiples of ninety degrees, correlations can be carried out using a template of only thirty-two stored values, or only sixteen stored values, with suitable phase-angle rotations of the products in blocks of thirty-two or sixteen values.

Automatic frequency control can be carried out by adjusting the frequency of the intermediate-frequency oscillator instead of the frequency of the local oscillator.

Those skilled in the art will recognize that further variations are possible within the scope claimed below.

What is claimed is:

1. A method of tuning a digital audio broadcast receiver according to complex-valued data obtained from frequency-differential demodulation of a received phase reference symbol, comprising the steps of:

(a) correlating said complex-valued data in a sliding manner, over a range or shifts, with a lower series of constant amplitude zero autocorrelation data known to have been transmitted on negatively-numbered carriers of said phase reference symbol, obtaining a lower correlation coefficient for each shift in said range;

(b) correlating said complex-valued data in a sliding manner, over said range or shifts, with an upper series of constant amplitude zero autocorrelation data known to have been transmitted on positively-numbered carriers of said phase reference symbol, obtaining an upper correlation coefficient for each shift in said range;

(c) finding a shift Srmax, in said range, at which said lower correlation coefficient and said upper correlation coefficient have a sum with maximum magnitude;

(d) storing the lower correlation coefficient Rlomax and upper correlation coefficient Rhimax obtained at said shift Srmax;

(e) determining whether said lower correlation coefficient Rlomax and said upper correlation coefficient Rhimax differ in relative magnitude by more than a first amount;

(f) determining whether said lower correlation coefficient Rlomax and said upper correlation coefficient Rhimax differ in phase angle by more than a second amount;

(g) deciding, from said steps (e) and (f), whether said shift Srmax is valid as a tuning indicator; and (h) adjusting the tuning of said digital audio broadcast receiver according to said shift Srmax, provided said shift Srmax is found valid in said step (g).

2. The method of claim 1, wherein said step (e) comprises deciding whether absolute values of said upper correlation coefficient Rhimax and said lower correlation coefficient Rlomax differ by more than a predetermined factor.

3. The method of claim 1, wherein said step (e) further comprises the steps of:

(i) determining an average power of said complex-valued data;

(j) calculating a product threshold from said average power; and (k) comparing an absolute value of a product of said lower correlation coefficient Rlomax and said upper correlation coefficient Rhimax with said product threshold.

4. The method of claim 1, wherein said step (f) further comprises the steps of:

(l) calculating a product RRhl of one of said lower correlation coefficient Rlomax and said upper correlation coefficient Rhimax with a complex conjugate of another one of said lower correlation coefficient Rlomax and said upper correlation coefficient Rhimax; and (m) comparing a real part of said product RRhl with an absolute value of an imaginary part of said product RRhl multiplied by a positive constant.

5. The method of claim 1, further comprising the steps of:

(n) determining an average power of said complex-valued data;

(o) calculating a sum threshold from said average power; and (p) comparing an absolute value of the sum of said lower correlation coefficient Rlomax and said upper correlation coefficient Rhimax with said sum threshold, said shift Srmax being treated as valid only if the absolute value of said sum exceeds said sum threshold.

6. The method of claim 1, wherein said step (h) is carried out only when a predetermined number of consecutive phase reference symbols yield identical valid shifts Srmax.

7. The method of claim 1, further comprising the steps of:

(q) counting consecutive phase reference symbols in which it is not true that said shift Srmax is valid and matches the shift Srmax found from an immediately preceding phase reference symbol, thereby obtaining an unmatch count; and (r) taking corrective tuning action when said unmatch count reaches a predetermined count value.

8. The method of claim 7, wherein said corrective tuning action includes selecting a first predetermined range for subsequent use as said range of shifts, further comprising the step of:

(s) selecting a second predetermined range, narrower than said first predetermined range, for subsequent use as said range of shifts, when said shift Srmax is valid and indicates that no adjustment is necessary in said step (h).

9. A digital audio broadcast receiver having a control unit employing the method of claim 1 for coarse tuning.

10. A digital audio broadcast receiver having a frequency-differential demodulator demodulating data received in a phase reference symbol to obtain complex-valued data, comprising:

a first correlator correlating said complex-valued data in a sliding manner, over a range or shifts, with a lower series of constant amplitude zero autocorrelation data known to have been transmitted on negatively-numbered carriers of said phase reference symbol, obtaining a lower correlation coefficient for each shift in said range;

a second correlator correlating said complex-valued data in a sliding manner, over said range or shifts, with an upper series of constant amplitude zero autocorrelation data known to have been transmitted on positively-numbered carriers of said phase reference symbol, obtaining an upper correlation coefficient for each shift in said range;

a search controller finding a shift Srmax, in said range, at which said lower correlation coefficient and said upper correlation coefficient have a sum with maximum magnitude;

a memory circuit coupled to said first correlator, said second correlator, and said search controller, storing the lower correlation coefficient Rlomax and upper correlation coefficient Rhimax obtained at said shift Srmax;

a multiplier coupled to said memory circuit, multiplying one of said lower correlation coefficient Rlomax and said upper correlation coefficient Rhimax by a complex conjugate of another one of said lower correlation coefficient Rlomax and said upper correlation coefficient Rhimax, thereby obtaining a product RRhl;

a first comparison circuit coupled to said multiplier, comparing a magnitude of said product RRhl with a first threshold;

a second comparison circuit coupled to said multiplier, comparing a phase angle of said product RRhl with a second threshold;

a validity logic circuit coupled to said second comparison circuit, generating a validity signal indicating validity of the shift Srmax stored in said memory circuit according to comparison results obtained by said first comparison circuit and said second comparison circuit; and a control unit coupled to said validity logic circuit, tuning said digital audio broadcast receiver according to the shift Srmax stored in said memory circuit and the validity signal generated by said validity logic circuit.

\* \* \* \* \*